United States Patent
Thomire et al.

(10) Patent No.: US 7,117,986 B2
(45) Date of Patent: Oct. 10, 2006

(54) CLUTCH RELEASE BEARING, IN PARTICULAR FOR MOTOR VEHICLE

(75) Inventors: Sylvain Thomire, Amiens (FR); Yves Saint-Martin, Camon (FR)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 10/204,352

(22) PCT Filed: Dec. 21, 2001

(86) PCT No.: PCT/FR01/04186

§ 371 (c)(1),
(2), (4) Date: Mar. 30, 2004

(87) PCT Pub. No.: WO02/052163

PCT Pub. Date: Jul. 4, 2002

(65) Prior Publication Data

US 2004/0154895 A1    Aug. 12, 2004

(51) Int. Cl.
*F16D 25/08* (2006.01)
*F16D 23/14* (2006.01)

(52) U.S. Cl. ............ 192/85 CA; 29/453; 29/898.07; 192/91 A; 192/98; 192/110 B; 384/617

(58) Field of Classification Search ............ 384/223, 384/617; 29/898.041
See application file for complete search history.

(56) References Cited

U.S. PATENT DOCUMENTS 4,357,058 A    11/1982    Sonnerat

| 4,608,741 | A | * | 9/1986 | Mallet ..................... 29/450 |
| 4,643,286 | A | * | 2/1987 | Lassiaz ..................... 192/98 |
| 4,815,867 | A |   | 3/1989 | Ladin |
| 4,854,436 | A | * | 8/1989 | Lassiaz et al. ............. 192/98 |
| 4,881,629 | A | * | 11/1989 | Gay et al. ................... 192/98 |
| 5,113,988 | A |   | 5/1992 | Caron |
| 5,287,951 | A | * | 2/1994 | Voit et al. ............. 192/85 CA |
| 5,641,049 | A |   | 6/1997 | Kajitani et al. |
| 6,056,446 | A |   | 5/2000 | Welter et al. |
| 6,354,188 | B1 | * | 3/2002 | Tobiasz ............... 192/85 CA |

FOREIGN PATENT DOCUMENTS

| FR | 2 470898 | 6/1981 |
| FR | 2 772 444 | 6/1999 |

* cited by examiner

*Primary Examiner*—Rodney H. Bonck
(74) *Attorney, Agent, or Firm*—Berenato, White & Stavish LLC

(57) ABSTRACT

The invention concerns a clutch release bearing comprising an axially mobile piston (14), and a ring (26I), integral with a raceway (C1), hooked on the piston (14) with axial-effect squeezing elastic means (38, 40). The ring (26I) is provided with a proximal surface (F1, 62) and a distal surface (F2, 70) arranged axially behind the proximal surface (F1, 62). The proximal surface (F1, 62) is supported on a first hooking surface (A1, 64) provided in the piston (14). The squeezing means (38, 40) are supported on the distal surface (F2, 70) of the ring (26I) and a second hooking surface (A2, 76) provided in the piston (14). The first (A1, 64) and second (A2, 76) hooking surfaces provided in the piston (14) are arranged axially in front of the distal surface (F2, 70) of the ring (26I) The invention also concerns a method for assembling the elements of said clutch release bearing.

14 Claims, 10 Drawing Sheets

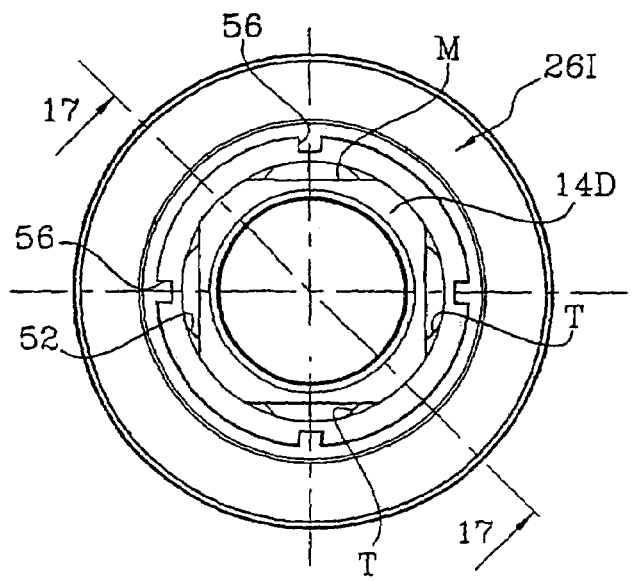
Fig. 16
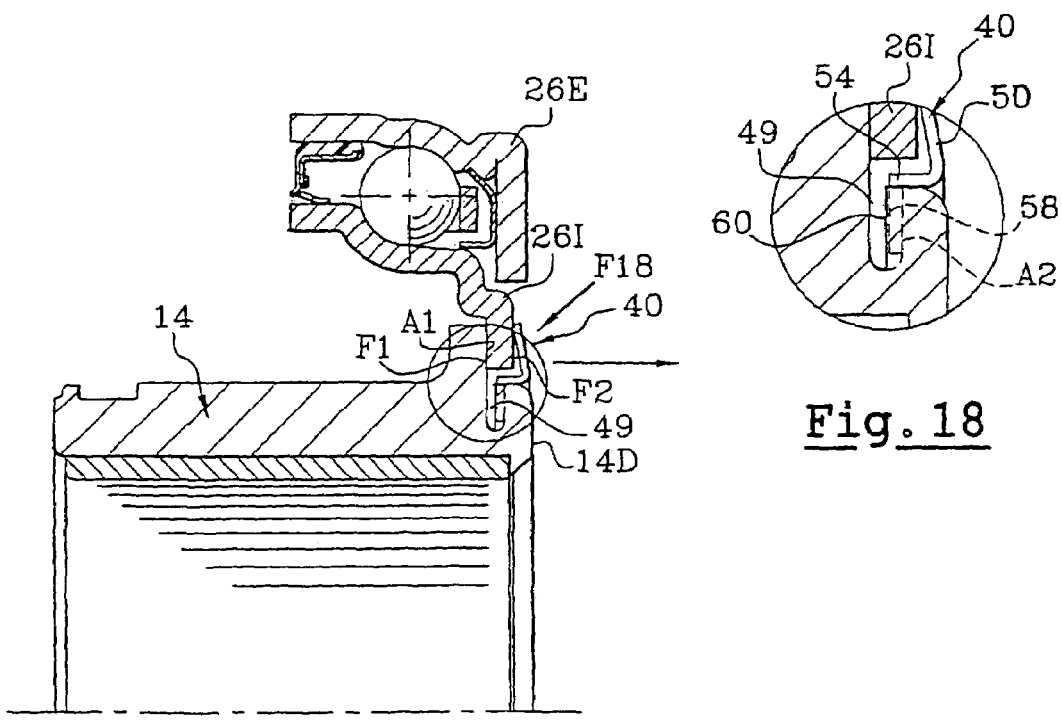
Fig. 17
Fig. 18

CLUTCH RELEASE BEARING, IN PARTICULAR FOR MOTOR VEHICLE

The present invention relates to a thrust bearing for a clutch, especially of a motor vehicle.

The present invention also relates to a method of assembling a piston and a ball bearing equipping the thrust bearing.

There is already known, in the state of the art, in particular from FR-A-2 738 886 (FR-95 11012), a thrust bearing for a clutch, especially of a motor vehicle, of the type comprising a piston, axially movable, and a ring, integral with a bearing race, hooked onto the piston by the use of elastic pinching means with an axial effect, the ring being equipped with a proximal face and with a distal face which is arranged axially after the proximal face, the proximal face bearing on a first hooking face formed in the piston, the pinching means bearing on the distal face of the ring and a second hooking face formed in the piston.

Generally, the above ring forms a fixed inner ring of a ball bearing, the latter also including a movable outer ring intended to turn around the fixed ring. The inner and outer rings form bearing races between which rolling elements are interposed, for example balls. The outer ring is usually intended to work in cooperation with the fingers of a diaphragm of the clutch.

The means of pinching the fixed inner ring, if appropriate, allow radial play for the ball bearing promoting self-centring of the thrust bearing.

In FR-A-2 738 886, the fixed inner ring is hooked onto the end of the piston close to the diaphragm by the use of an elastic washer with axial effect equipped with a proximal face (spaced away from the diaphragm), bearing on the distal face of the fixed inner ring, and with a distal face (close to the diaphragm), bearing on the second hooking face formed in the piston. This second hooking face is arranged axially after the distal face of the fixed inner ring, towards the diaphragm, which increases the axial bulk of the piston towards this diaphragm.

The aim of the invention, in particular, is to reduce the axial bulk of a clutch thrust-bearing piston, towards the diaphragm of this clutch.

To that end, the subject of the invention is a thrust bearing for a clutch, especially for a motor vehicle, of the above-mentioned type, characterised in that the first and second hooking faces formed in the piston are arranged axially in front of the distal face of the ring.

According to the invention, the upper ends of the hooking claws are in abutment circumferentially against the axial, face-to-face, edges of the notches axially accommodating the hooking claws in order to block the piston in rotation and thus obtain angular indexing of it.

According to characteristics of different embodiments of this thrust bearing:

- the first and second hooking faces formed in the piston form distal and proximal hooking faces, with regard to one another respectively;
- the first and second hooking faces formed in the piston form proximal and distal hooking faces, with respect to one another respectively;
- the pinching means comprise an elastic washer with axial effect, equipped with a proximal face bearing on the distal face of the ring, and an annular attachment equipped with a distal collar bearing on a distal face of the washer and with proximal hooking claws bearing on the second hooking face formed in the piston;
- the piston is equipped with radial piercings for access to the second hooking face formed in the piston and to the ends of the hooking claws bearing on this second hooking face;
- the piston is equipped with axial piercings for the hooking claws to pass through, opening out into the second hooking face formed in the piston;
- the thrust bearing being of the type in which the first hooking face is delimited by a shoulder formed in a distal end segment of the piston, the distal end, segment of the piston, in its peripheral axial surface opening out into its distal-end transverse surface, in-line with each axial piercing, includes a mounting notch which is intended axially to receive the associated hooking claw, so as to allow angular indexing of the piston with regard to the hooking claws, in the course of its assembly with the annular attachment;
- the axial surface of each mounting notch is extended axially towards the second hooking face or proximal hooking face by a control ramp inclined axially towards the proximal hooking face and radially outwards, so as to cause an elastic deformation, radially outwards, of the associated hooking claw, in the course of the assembly of the piston with the annular attachment, before the said claw is recessed into the piston;
- each control ramp extends axially towards the proximal hooking face within the associated axial piercing;
- the pinching means comprise an annular attachment equipped with an outer elastic collar having an axial effect, bearing on the distal face of the ring, and with an inner web bearing on the second hooking face formed in the piston;
- the outer collar is elastically deformable axially between a manoeuvring position, in which the attachment is in an intermediate position for fitting or removal, and a rest position, in which the attachment is in normal position for hooking of the ring, the inner web and the second hooking face formed in the piston comprising complementary recessing means intended, on the one hand, to work together when the inner web and the second hooking face are in a predetermined relative hooking angular position, and, on the other hand, to, be released by elastic deformation of the outer collar towards its manoeuvring position;
- the complementary recessing means comprise at least one notch formed in the inner web intended to work in cooperation with a complementary axial projection formed in the second hooking face formed in the piston;
- the second hooking face formed in the piston is carried by a distal end of this piston, the inner web of the annular attachment and the distal end of the piston being delimited by complementary recessing contours intended to work together when the annular attachment and the piston are in a predetermined relative intermediate angular position for fitting/removal, offset in angle with respect to the relative angular position for hooking;
- an annular attachment is equipped, on the one hand, with a distal collar featuring elasticity with axial effect the proximal face of which bears on the distal face of the ring and, on the other hand, with proximal hooking claws bearing on the second hooking face formed in the piston.

The invention also proposes a method of assembling a piston and a ball bearing which are designed to equip a thrust bearing for a clutch exhibiting one of the foregoing characteristics, characterised in that it includes the following successive stages:

a) the positioning of the annular attachment, by its lower face, on the base of a fitting tool;

b) the fitting of the elastic washer coaxially on the annular attachment;

c) the fitting of the ball bearing on the elastic washer;

d) the fixing of the piston onto the ball bearing by recessing of the claws for hooking the annular attachment into the axial piercings of the piston.

According to another characteristic of this method, the fixing d) of the piston includes the following successive stages:

d1) the axial lowering of the piston towards the ball bearing until it is in axial abutment, by its lower-end transverse surface, against the free upper axial ends of the hooking claws;

d2) the angular indexing of the piston, with regard to the hooking claws of the attachment, by rotation of the piston about its axis until the hooking claws come into radial abutment in the mounting notches;

d3) the axial lowering of the piston towards the ball bearing until the hooking claws are recessed into the axial piercings of the piston.

The method according to the invention is simpler than the known methods, which facilitates its automation.

The invention will be better understood on reading the description which will follow, given solely by way of example and given by referring to the drawings, in which:

FIGS. 16 and 17 are views similar to FIGS. 14 and 15 showing the pinching means in a position for hooking of the ring;

FIG. 18 is a detailed view of the circled part F18 of FIG. 17.

Figure 1:
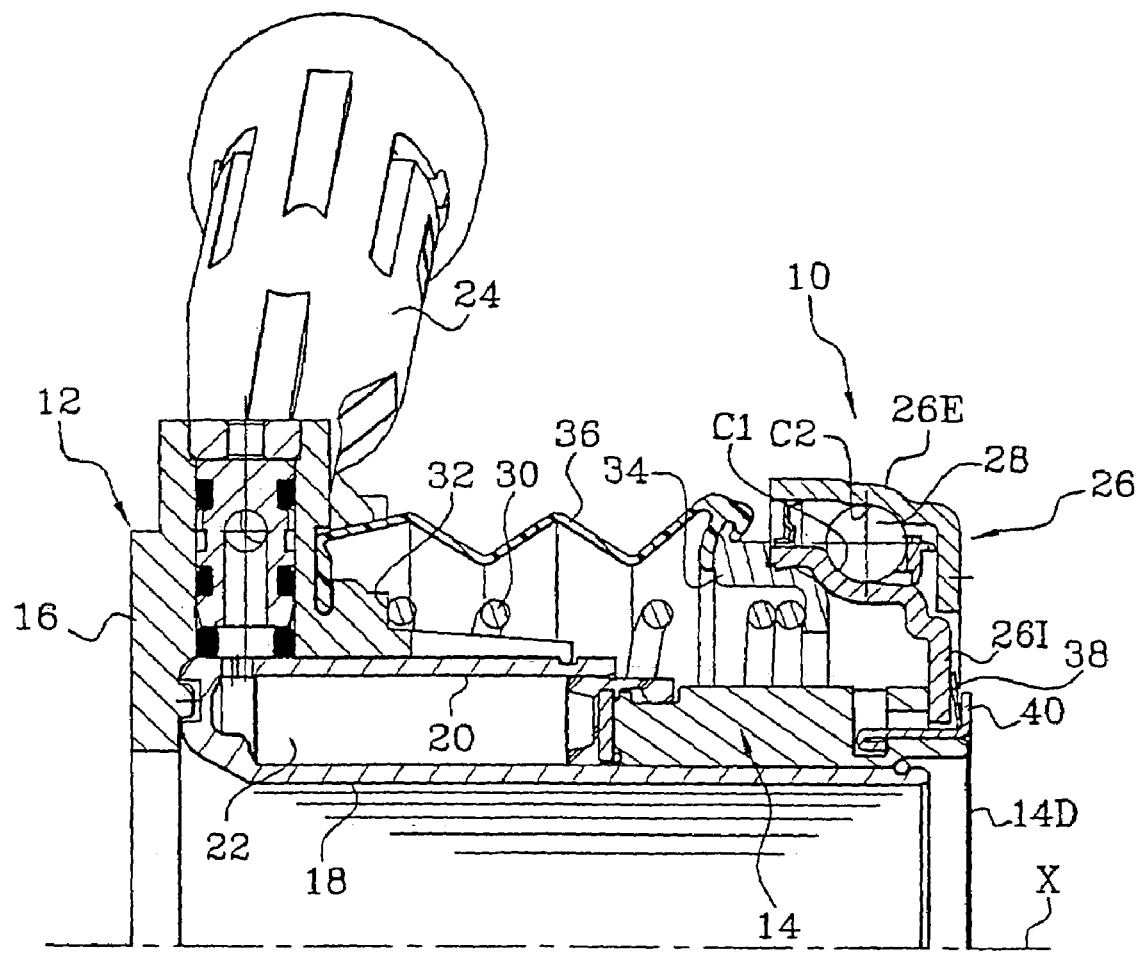
FIG. 1 is a view in axial section of a thrust bearing for a clutch according to a first embodiment of the invention.
Figure 2:
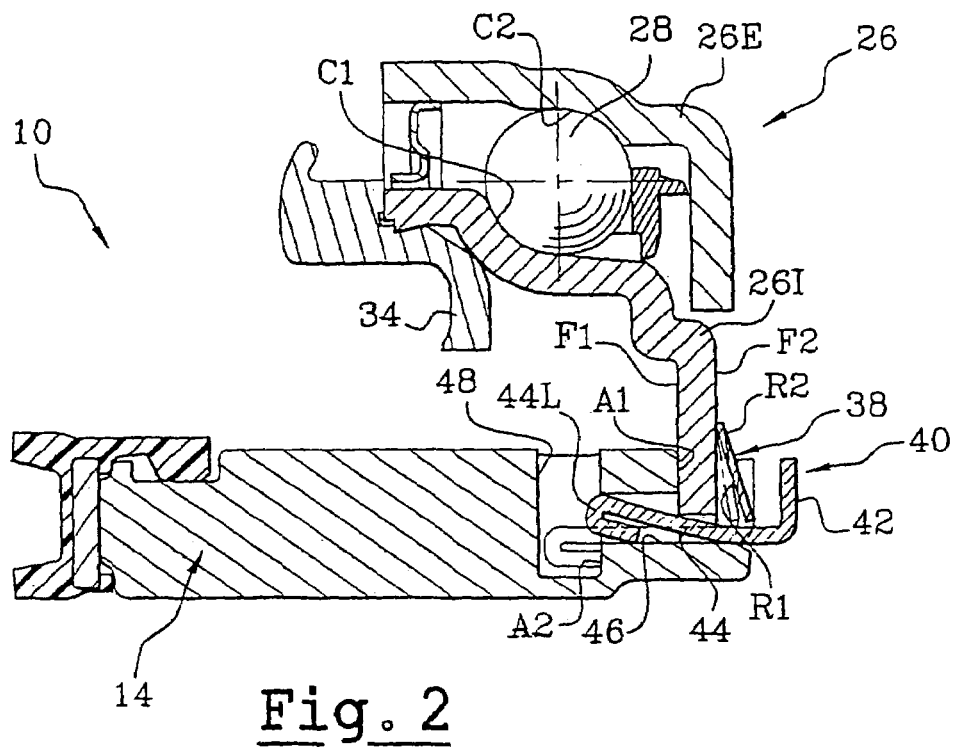
FIG. 2 is a partial view on an enlarged scale of the thrust bearing represented in FIG. 1, showing a stage of fitting the pinching means onto the piston.
Figure 3:
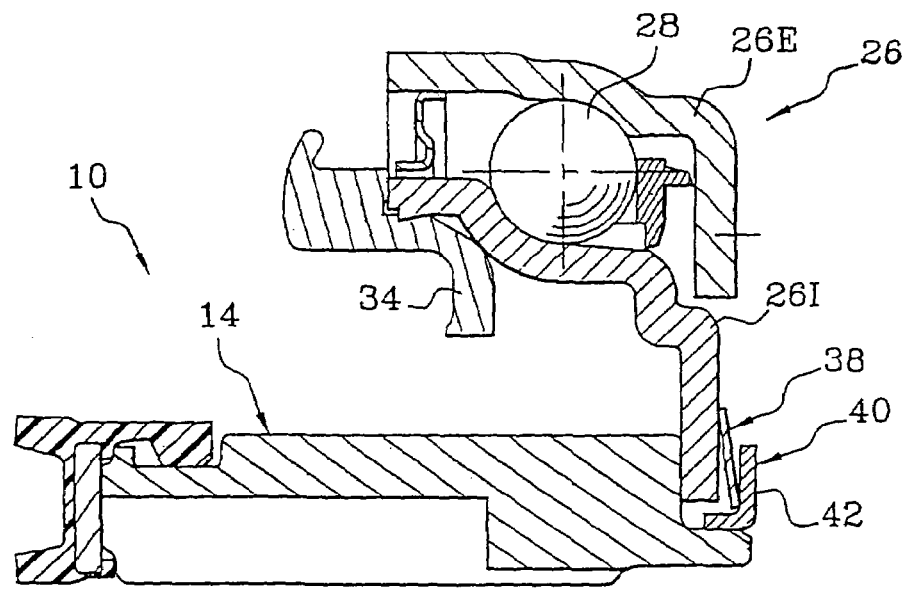
FIG. 3 is a view similar to FIG. 2, the sectional plane being offset in angle by comparison with that of this FIG. 2.

In FIGS. 1 to 3 has been represented a thrust bearing for a clutch, especially for a motor vehicle, according to a first embodiment of the invention, designated by the general reference 10. The thrust bearing 10 is of the type with hydraulic control.

The thrust bearing 10 comprises a fixed body 12 and a piston 14 which can be moved in translation parallel to an axis X. The fixed body 12 includes a support 16, intended to be fixed on a casing of the clutch, and a tubular member 18 for guidance of the piston 14, surrounded by this piston 14.

The thrust bearing 10 is of concentric type. In fact, the tubular member 18 delimits a passage for a gearbox input shaft (not represented in the figures), substantially coaxial with the piston 14 and with the tubular member 18.

The tubular member 18 is equipped with an outer skirt 20 delimiting an annular chamber 22 for control of the piston 14, substantially coaxial with the latter and with the tubular member 18. The chamber 22 is connected to a hydraulic control circuit by the use of conventional means 24.

In what follows, an element will be described as "proximal" when it is axially close to the support 16 and to the wall of the casing on which this support is fixed, and as "distal" in the opposite case. A first element is arranged axially "in front of" a second element when this first element is closer to the wall of the casing on which the support 16 is fixed than this second element.

In accordance with a conventional model of operation, the piston 14 can be displaced axially between a proximal position for engagement of the clutch (output shaft of the engine coupled to the input shaft of the gearbox) and a distal position, as represented in FIG. 1, for disengagement of the clutch (output shaft of the engine decoupled from the input shaft of the gearbox).

The distal end 14D of the piston carries a ball bearing 26 equipped with a fixed inner ring 26I and with a movable outer ring 26E intended to turn around the fixed ring. The inner 26I and outer 26E rings delimit bearing races C1, C2 between which bearing elements are interposed, for example balls 28.

In accordance with a conventional mode of operation, the outer ring 26E forms a drive element intended to work permanently in cooperation with the fingers of the diaphragm of the clutch. Maintaining the contact between the outer ring 26E and the fingers of the diagram is undertaken by a compression spring 30 interposed between a proximal seat 32, formed on the support 16, and a distal seat, delimited by a cup 34 in axial abutment on the inner ring 26I. This spring 30 is protected by a peripheral bellows 36.

Referring especially to FIGS. 2 and 3, it is seen that the inner ring 26I is equipped with two proximal F1 and distal F2 faces, substantially transverse to the axis X. In accordance with the axial-orientation conventions detailed above, the distal face F2 is arranged axially after the proximal face F1.

The proximal face F1 of the inner ring 26I bears on a first hooking face A1 delimited by a shoulder formed in the distal end 14D of the piston. The inner ring 26I is hooked onto the distal end 14D of the piston by the use of elastic pinching means with axial effect, which will be described below. These pinching means bear on the distal face F2 of the inner ring 26I and a second hooking face A2 formed in the distal end 14D of the piston. In the example described, this second hooking face A2 consists of several parts spaced in angle from each other around the X axis.

In accordance with the first embodiment of the invention, the pinching means comprise an elastic washer 38 with axial effect and an annular attachment 40 equipped with a distal collar 42 and with at least two proximal hooking claws 44 distributed around the X axis. These claws 44 are equipped with free ends 44L forming hooks. Axial piercings 46 for the hooking claws 44 to pass through are formed in the distal end 14D of the piston. These axial piercings 46 open out into the second hooking face A2 formed in the piston.

The elastic washer 38 is equipped with a proximal face R1, bearing on the distal face F2 of the inner ring 26I, and with a distal face R2, on which the distal collar 42 bears. The free ends 44L of the hooking claws 44, forming hooks, bear on the second hooking face A2 formed in the piston.

Radial piercings 48, allowing access to the second hooking face A2 and to the ends of the hooking claws 44 bearing on this second hooking face A2, are formed in the distal end 14D of the piston.

It will be noted, in accordance with the axial-orientation conventions detailed above, that the first A1 and second A2 hooking faces formed in the piston 14 form distal and proximal hooking faces, respectively, with regard to one another.

It will likewise be noted that the first A1 and second A2 hooking faces are arranged axially in front of the distal face F2 of the inner ring 26I, which makes it possible to limit the axial bulk of the piston 14 towards the diaphragm.

For fitting the inner ring 26I onto the piston 14, the assembly method employed is as follows.

Initially, the inner ring 26I is placed bearing against the first hooking face A1 formed in the piston.

Then, the annular attachment 40, carrying the elastic washer 38, is hooked onto the distal end of the piston 14, by engaging the hooking claws 44 into the axial piercings 46. The hooking claws 44 are deformed elastically radially so as to allow their free ends 44L to pass into the axial piercings 46, as represented in solid line in FIG. 2. It will be noted that a radial clearance between the piston 14 and the inner ring 26I, which is usual in a self-centring thrust bearing like the one illustrated in the figures, allows the hooking claws 44 to pass between these [sic] piston 14 and inner ring 26I.

By elastically deforming the elastic washer 38 by pressure against the distal face F2 of the inner ring 26I, the free ends 44L of the hooking claws 44 are hooked onto the second hooking face A2 formed in the piston, as represented in solid line in FIG. 1 or in dots and dashes in FIG. 2. The free ends 44L of the hooking claws 44 are held in abutment against this second hooking face A2 by the elastic-return effect of the washer 38. The inner ring 26I is immobilised axially onto the piston 14 by clamping between the first hooking face A1 formed in the piston and the elastic washer 38.

This method of assembly may be enhanced with a view to facilitating its automation.

In effect, during assembly, it is necessary to keep the ball bearing 26 and the elastic washer 38 correctly centred on the piston 14 if it is wished to be able to insert the hooking claws 44 of the annular attachment 40 into the axial piercings 46.

As the ball bearing 26 and the washer 38 are mounted against an outer shoulder A1 of the piston 14, it is difficult to keep them in centred position.

Another difficulty encountered in implementing an automated assembly process is the angular indexing of the annular attachment 40 with respect to the piston 14, in such a way that the hooking claws 44 are positioned face-to-face with the axial piercings 46 associated with the piston 14.

By reason of the difficulties encountered in order to automate the operation of assembling of the piston 14 with the ball bearing 26, it is difficult to reduce the assembly time and the manufacturing costs.

Consequently, with a view to facilitating automation of the method of assembling the thrust bearing 10, an enhanced piston 14 and an enhanced assembly method using the said piston 14 are proposed, this assembling being described by reference to FIGS. 4 to 12.

In the remainder of the description, elements which are identical or similar to those described in connection with FIGS. 1 to 3 will bear identical references.

For the description of the enhanced piston 14, only the elements which are of use in understanding the extent to which the piston 14 is differentiated from the piston 14 which was described by reference to FIGS. 1 to 3 will be described.

In the case of FIGS. 4 to 12, especially with a view to facilitating the understanding of the operation of the assembly method, in a non-limiting way a vertical, upper, lower, etc. terminology will be adopted, which corresponds to the orientation of the axis X of the thrust bearing 10 in position on the mounting tool.

It is noted that, according to this terminology, the terms "upper" and "lower" are equivalent respectively to the terms "proximal" and "distal", when referring to FIGS. 1 to 3. Likewise, when an upwards orientation is mentioned, by reference to FIGS. 4 to 12, that corresponds to an orientation from right to left when considering FIGS. 1 to 3.

In FIGS. 4 to 12, the clutch thrust bearing 10 according to the invention is distinguished from the one which is represented in FIGS. 1 to 3 by the structure of a part of its piston 14.

According to the embodiment represented here, the cup 34 is mounted integral with the ball bearing 26. In the remainder of the description, when the fitting of the ball bearing 26 on the piston 14 is being described, it will be understood that the ball bearing 26 is already equipped with the cup 34.

In FIGS. 4 to 12, only the pieces participating in the assembling of the piston 14 with the ball bearing 26 are represented.

Figure 4:
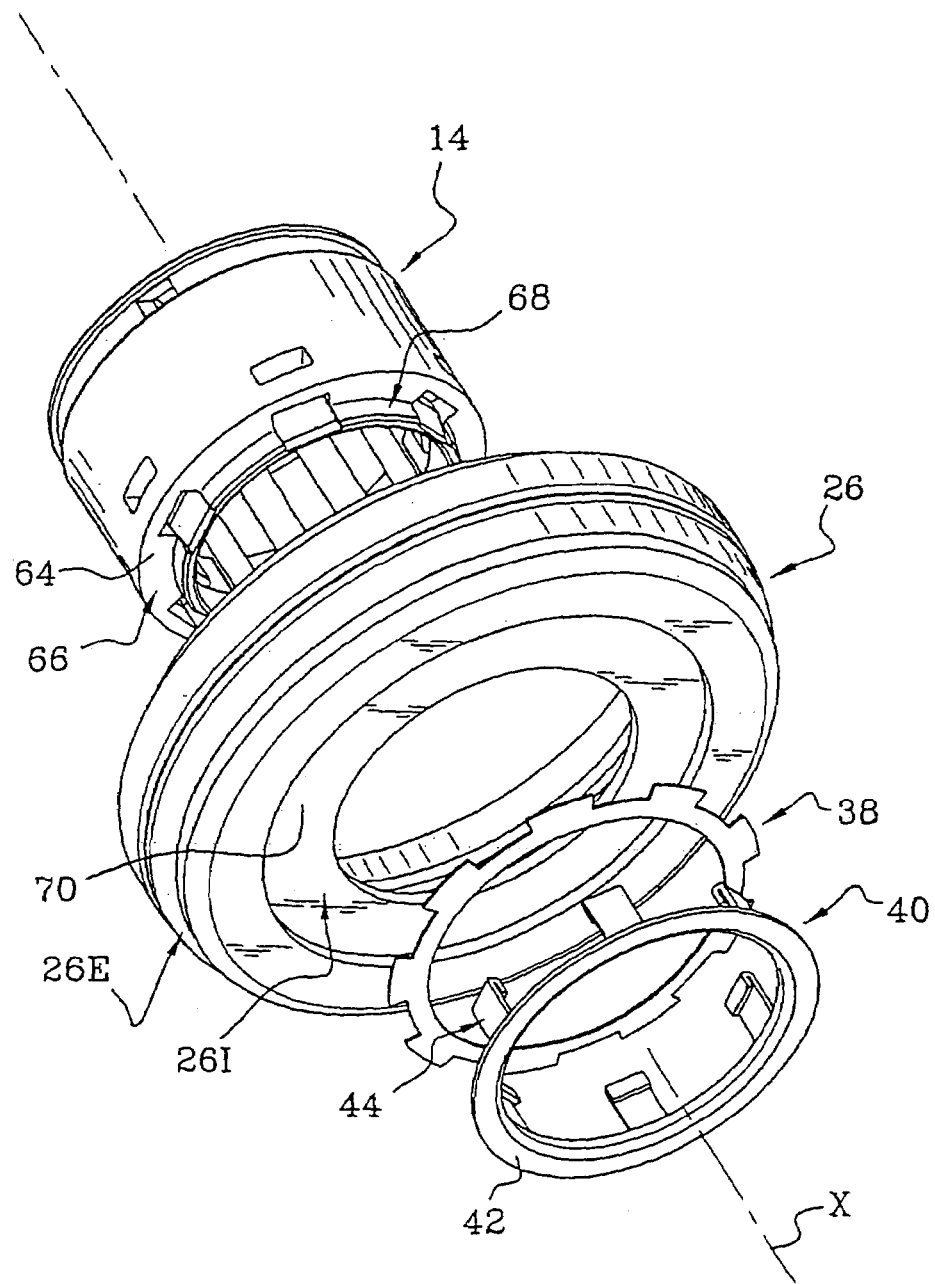
FIG. 4 is an exploded view in perspective which represents the pieces participating in the assembling of an improved piston with the ball bearing of a clutch thrust bearing similar to that of FIG. 1.

In the exploded view of FIG. 4, the piston 14, the ball bearing 26, the elastic washer 38 and the annular attachment 40 have therefore been represented, from top to bottom.

In FIGS. 4 to 12, the axis X of the thrust bearing 10 has been represented along a substantially vertical direction, which corresponds overall to the direction of assembly of the elements of the thrust bearing 10.

Figure 7:
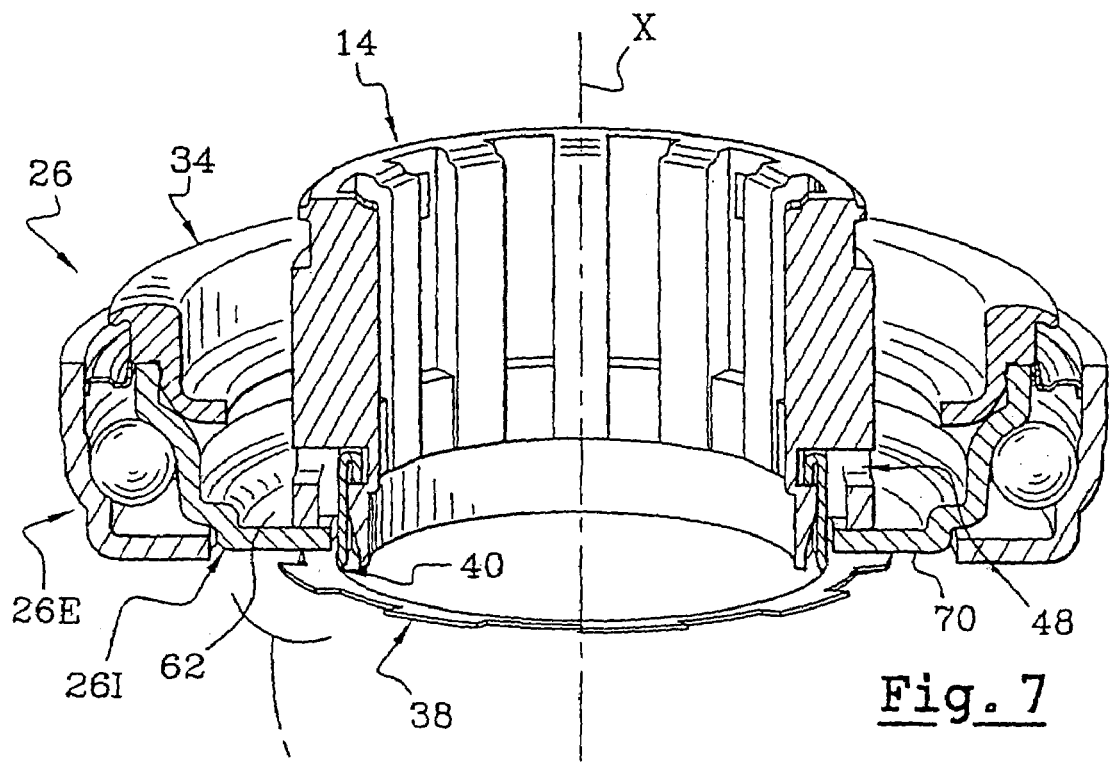
FIG. 7 is a view in perspective and in axial section which represents the piston of FIG. 4 assembled with the ball bearing.
Figure 8:
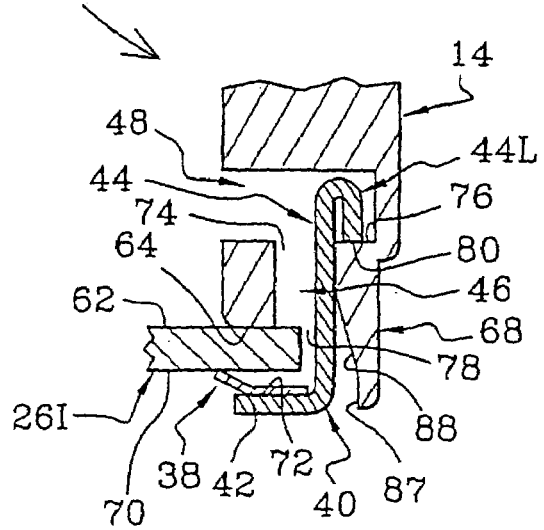
FIG. 8 is an enlarged view in cross-section of a detail of FIG. 7 representing a hooking claw recessed into an axial piercing of the piston.

As represented in FIGS. 7 and 8 especially, the upper face 62 of the inner ring 26I bears on a lower hooking face 64 delimited by a shoulder 66 formed in the outer axial surface of the lower end segment 68 of the piston 14.

The elastic washer 38 is interposed axially between the lower face 70 of the inner ring 26I and the annular attachment 40.

The annular attachment 40 is equipped with a lower collar 42, delimiting an upper face 72 in axial abutment against the elastic washer 38, and with several upper hooking claws 44 which extend substantially axially upwards and which are inserted through associated axial piercings 46 formed in the wall of the piston 14.

Each axial piercing 46 opens out axially upwards, via an upper aperture 74, into an upper hooking face 76 and, downwards, via a lower aperture 78, into the lower hooking face 64.

It will be noted that, just as the inner ring 26I which is represented in FIGS. 4 to 12 is identical to the one which is represented in FIGS. 1 to 3, the upper 62 and lower 70 faces are identical respectively to the proximal F1 and distal F2 faces.

Moreover, the lower 64 and upper 76 hooking faces of the piston 14 represented in FIGS. 4 to 12, are identical respectively to the first A1 and to the second A2 hooking faces of the piston 14 represented in FIGS. 1 to 3.

The free end segments 44L of the hooking claws 44 are curved over here inwards in such a way that they extend substantially axially downwards, forming hooks, or returns, which delimit an axial bearing surface 80 oriented downwards.

The hooking claws 44 are distributed in angle here in a regular way.

Figure 6:
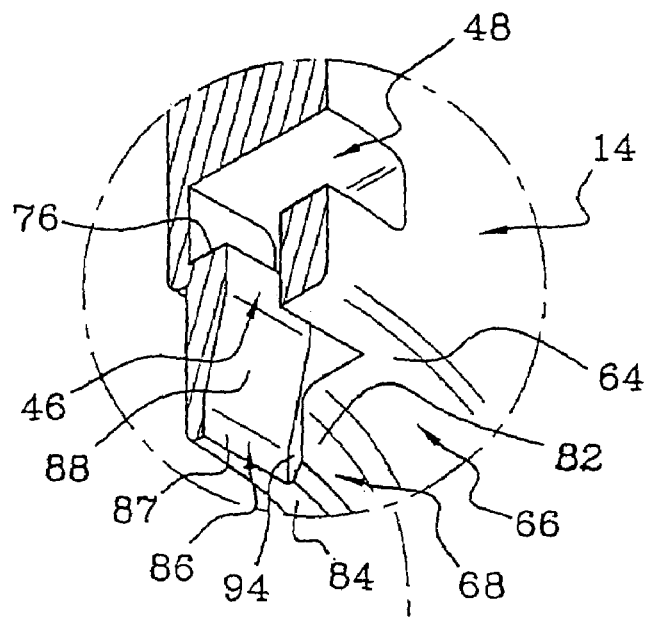
FIG. 6 is an enlarged view of a detail of FIG. 5 representing a notch and an axial piercing of the piston.
Figure 5:
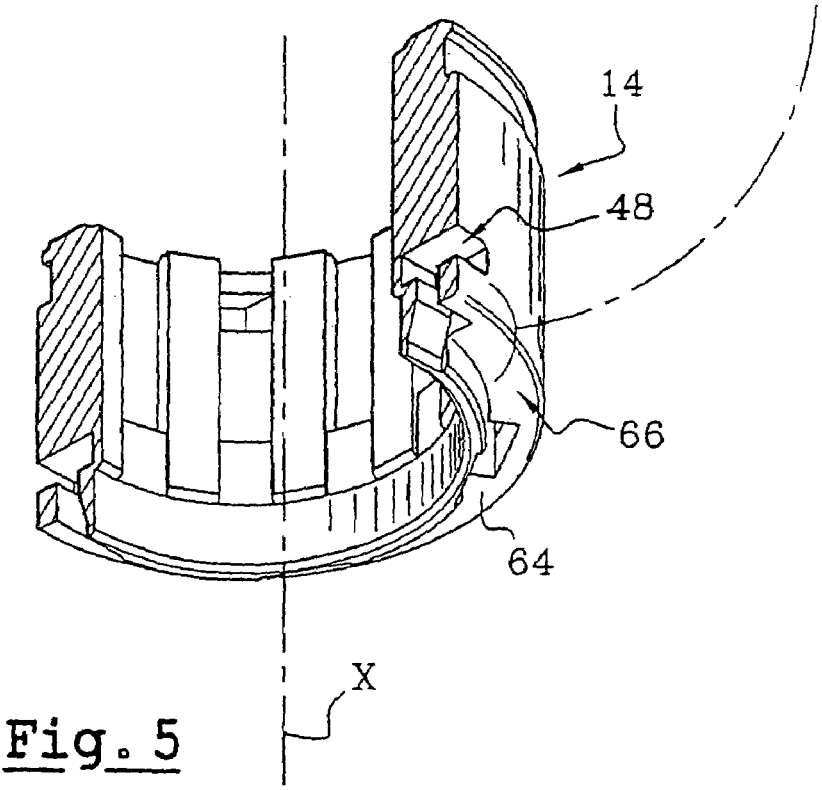
FIG. 5 is a view in perspective and in axial section which represents the piston of FIG. 4.

In accordance with the teachings of the invention, and as has been represented especially in FIGS. 5 and 6, the lower end segment 68 of the piston 14, in its peripheral axial surface 82 opening out into its lower end transverse surface 84, or lower edge (designated by the reference 14D in FIGS. 1 to 3), in line with each axial piercing 46, includes a mounting notch 86 which is designed axially to accommodate the associated hooking claw 44.

The mounting notches 86 especially make it possible to index the piston 14 in angle with respect to the hooking claws 44, in the course of the assembling of the piston 14 with the annular attachment 40.

According to the embodiment represented here, the axial surface of each mounting notch 86 is extended axially upwards by a control ramp 88 inclined axially upwards and radially outwards.

Each control ramp 88 extends axially upwards within the associated axial piercing 46.

Each control ramp 88 is designed to cause an elastic deformation, radially outwards, of the associated hooking claw 44, in the course of the assembling of the piston 14 with the annular attachment 40, before the said claw 44 is recessed into the piston 14.

The method according to the invention of assembling the enhanced piston 14 with the ball bearing 26 will now be described, especially by reference to FIGS. 9 to 12 which represent various phases of this assembling.

In the course of a first stage of the assembling method according to the invention, the annular attachment 40 is positioned, by its lower face 90, onto the base of a fitting tool (ft) of conventional type.

Then, in the course of a second stage of the method, the elastic washer 38 is fitted coaxially onto the upper face 72 of the annular attachment 40.

Next, the ball bearing 26 is fitted coaxially onto the elastic washer 38, such that the elastic washer 38 is interposed between the upper face 72 of the annular attachment 40 and the lower face 70 of the lower ring 26I of the ball bearing 26.

Figure 9:
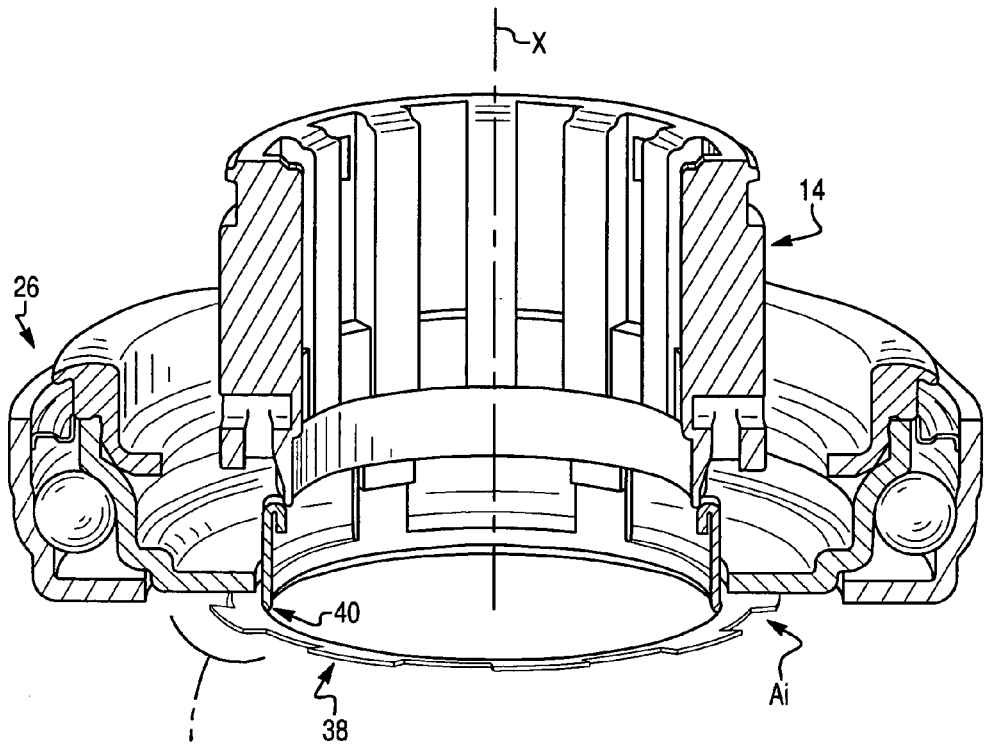
FIG. 9 is a view similar to that of FIG. 7 which represents an intermediate assembly comprising the ball bearing before the fitting of the piston of FIG. 4.
Figure 10:
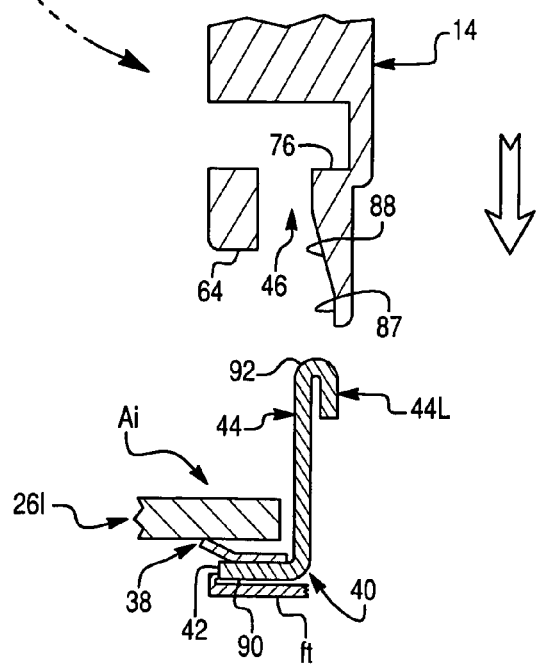
FIG. 10 is an enlarged view in cross-section of a detail of FIG. 9 representing a hooking claw before it is recessed into an axial piercing of the piston.

An intermediate assembly Ai is obtained here, which consists of the annular attachment 40, the elastic washer 38 and the ball bearing 26, and which is represented in FIGS. 9 and 10, before the fitting of the piston 14.

In the course of the last stage of the method, the piston 14 comes to be fixed onto the ball bearing 26 by recessing the hooking claws 44 of the annular attachment 40 into the axial piercings 46 of the piston 14.

More precisely, in the course of this last stage, the piston 14 is displaced axially towards the ball bearing 26 until it is in axial abutment, by its lower end transverse surface 84, or lower edge, against the free upper axial ends 92 of the hooking claws 44.

When the lower edge 84 of the piston 14 comes into axial abutment against the upper ends 92 of the hooks 44L of the hooking claws 44, since the upper ends 92 are rounded, this causes a slight elastic deformation of the hooking claws 44 outwards, such that the upper ends 92 of the hooking claws 44 and the lower edge 84 overlap radially.

In this position, by causing the piston 14 to turn about its axis X, the upper ends 92 of the hooking claws 44 slide in a circumferential direction on the lower edge 84 until they each encounter a mounting notch 86.

When the upper ends 92 of the hooking claws 44 encounter their associated mounting notches 86, they penetrate vertically within them, and then bear radially inwards against the outer axial surface 87 of the notch 86. In this position, the piston 14 is locked in rotation since the upper ends 92 of the hooking claws 44 are accommodated axially in the mounting notches 86 and they are then in circumferential abutment against the face-to-face axial edges 94 of each notch 86 (FIG. 6).

The tool which manipulates the piston 14 then perceives a resisting force indicating that the piston 14 is correctly indexed in angle, that is to say that the hooking claws 44 are in line with the associated axial piercings 46.

Figure 11:
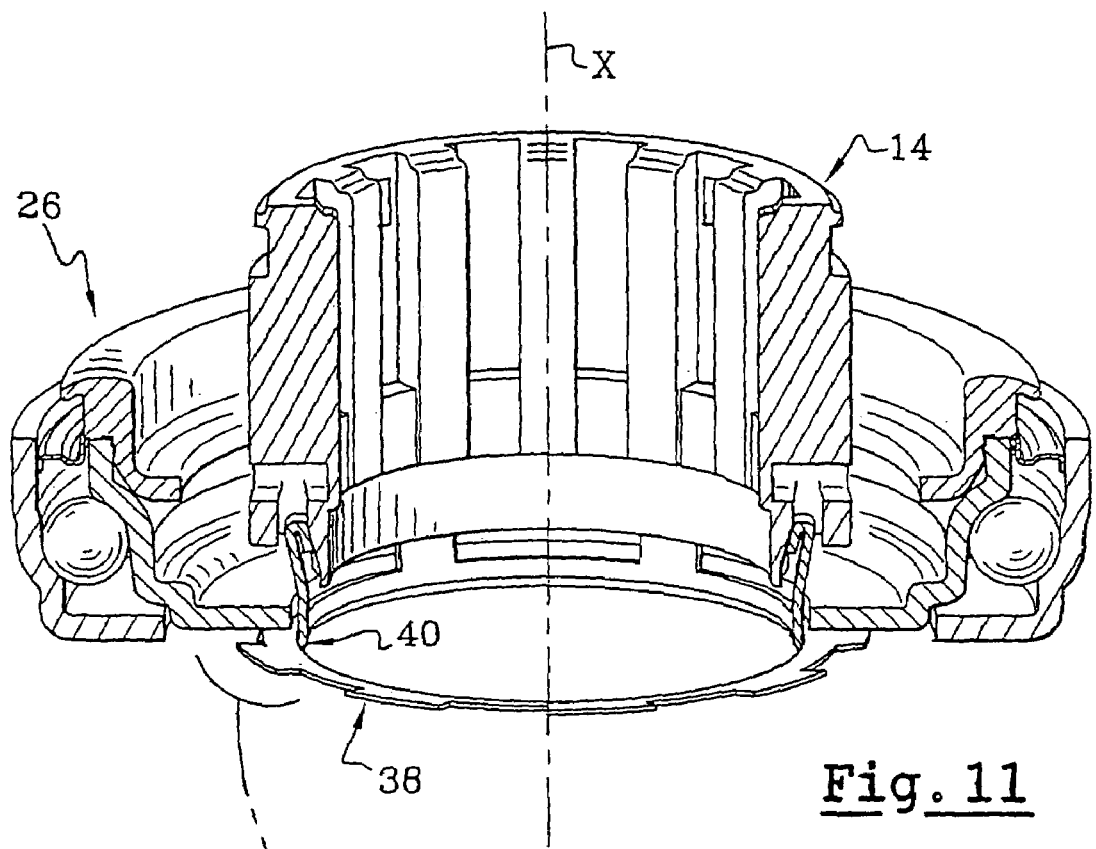
FIG. 11 is a view similar to that of FIG. 7 which represents the intermediate assembly and the piston of FIG. 4 in the course of fitting.
Figure 12:
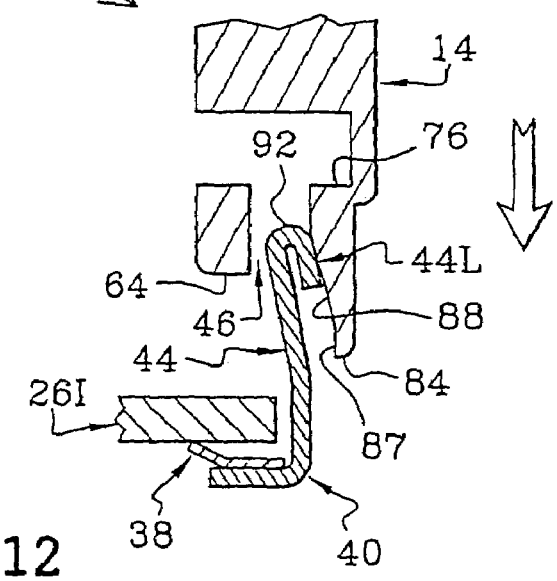
FIG. 12 is an enlarged view in cross-section of a detail of FIG. 11 representing a hooking claw in the course of recessing into an axial piercing of the piston.

It is therefore possible to carry on with the axial lowering of the piston 14 downwards, as has been represented in FIGS. 11 and 12, the control surfaces 88 of the notches 86 forming ramps working in cooperation then with the hooking claws 44 so as to cause their radial deformation outwards, in such a way as to facilitate and ensure their elastic recessing into the axial piercings 46 of the piston 14.

At the end of travel of the piston 14, that is to say in the position which is represented especially in FIGS. 7 and 8, the hooking claws 44 elastically retake their initial shape, in such a way that their transverse bearing surface 80 is located face-to-face with the associated upper hooking face 76 of the piston 14.

In this final position, the lower hooking face 64 of the piston 14 is in axial abutment against the upper face 62 of the inner ring 26I.

It will be noted that the rotational movement of the piston 14 and its axial-translation movement downwards can be combined in such a way that the piston 14 overall describes a helical movement until it is indexed in angle.

It will be noted that the assembling operation takes place in the reverse direction with respect to the method described by reference to FIGS. 1 to 3, since, in the past, the ball bearing 26 was first fitted onto the piston 14, then the elastic washer 38, then the annular attachment 40.

In FIGS. 13 to 18, a thrust bearing for a clutch has been represented, especially for a motor vehicle, according to a second embodiment of the invention. In these figures, the elements which are analogous to those of the preceding figures are designated by identical references.

As in the first embodiment of the invention, the first A1 and second A2 hooking faces are arranged axially in front of the distal face F2 of the inner ring 26I. However, in this case, in accordance with the axial-orientation conventions used with reference to FIGS. 1 to 3, the first A1 and second A2 hooking faces formed in the piston 14 form proximal and distal hooking faces respectively with respect to one another.

Moreover, the second hooking face A2 formed in the piston is delimited by an annular groove 49 formed in the distal end 14D of the piston.

The annular attachment 40 in accordance with the second embodiment of the invention comprises an outer elastic collar 50 with axial effect, bearing on the distal face F2 of the inner ring 26I, and an inner web 52 bearing on the second hooking face A2 formed in the piston 14. The web 52 consists of several parts spaced in angle from each other around the axis X, that is to say, in the example illustrated, four parts in the shape of disk segments. The outer collar 50 is linked to the inner web 52 by a linking ferrule 54 allowing radial centring of the annular attachment 40 around the piston 14. The outer collar 50 is fitted with manoeuvring notches 56 especially allowing its rotational displacement around the axis X.

Figure 15:
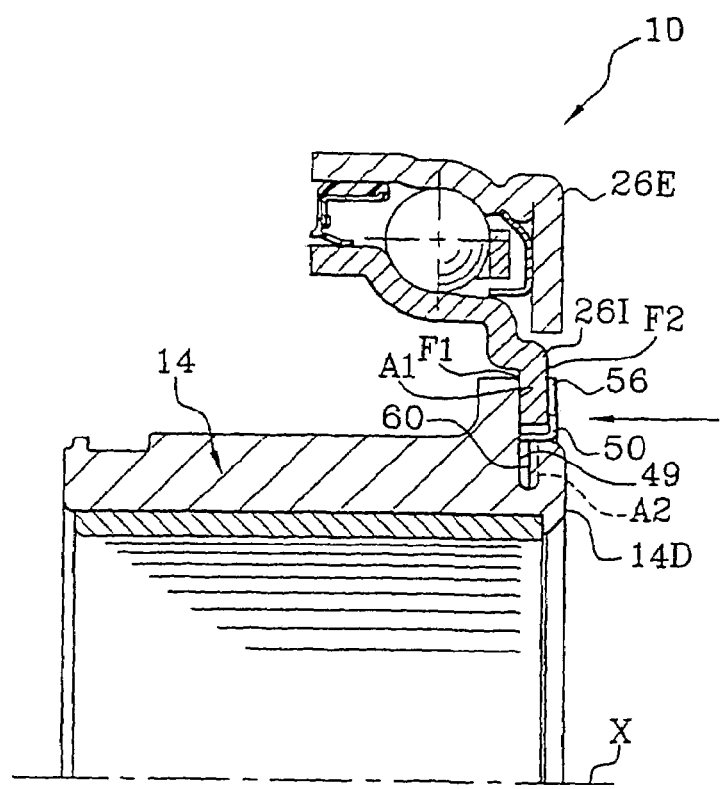
FIG. 15 is a half-view in axial section, along the line 15—5 of FIG. 14, of the thrust bearing for a clutch represented in FIGS. 13 and 14.

The outer collar 50 is elastically deformable axially between a manoeuvring position, as represented in FIG. 15, in which the attachment 40 is in an intermediate fitting or removal position, and a rest position, as represented in FIG. 17, in which the attachment 40 is in normal position for hooking of the inner ring 26I.

Figure 13:
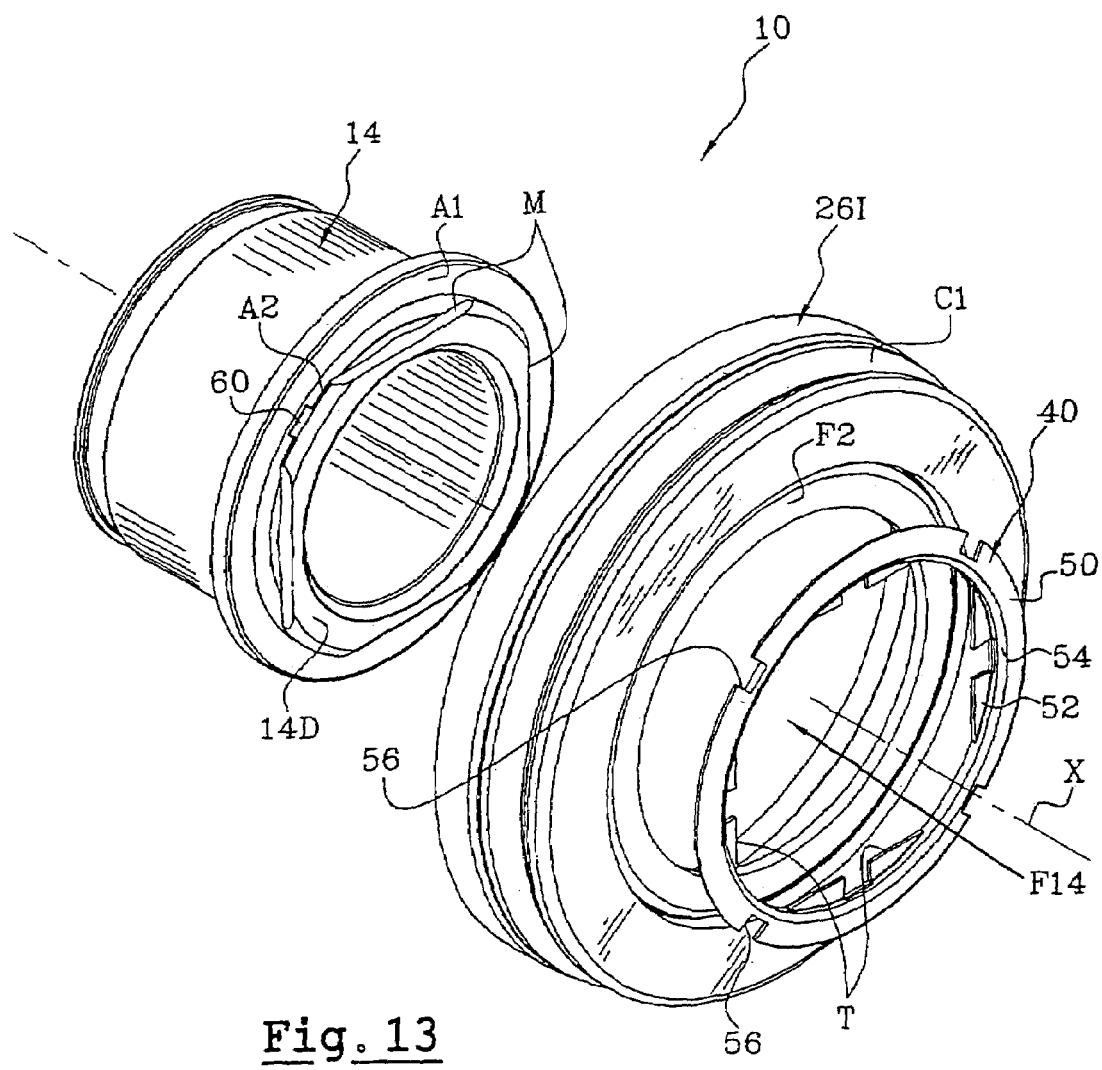
FIG. 13 is an exploded view in perspective of the principal elements relating to the invention of a thrust bearing for a clutch according to a second embodiment of this invention.
Figure 14:
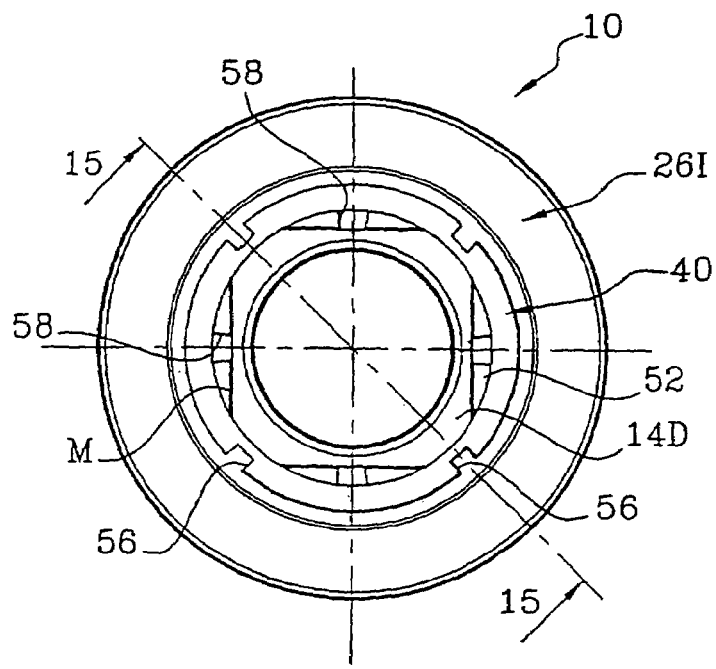
FIG. 14 is a view along the arrow F14 of FIG. 13, in which the pinching means are in an intermediate position for fitting/removal of the ring.

Furthermore, the annular attachment 40 can be displaced in angle, with respect to the piston 14 and, in particular, to the second hooking face A2, between a first predetermined position, called intermediate fitting/removal position, as represented in FIGS. 13 to 15, and a second predetermined position, called hooking position, as represented in FIGS. 16 and 17.

It will be noted that the distal end 14D of the piston, in which the second hooking face A2 is formed, and the inner web 52 of the attachment 40 are delimited by complementary recessing contours intended to work in cooperation with each other when the annular attachment 40 and the piston 14 are in the intermediate relative angular fitting/removal position (offset in angle with respect to the relative hooking angular position), as represented in FIGS. 14 and 15. In effect, the four segments of the inner web 52 are delimited by chords T intended to work in cooperation with complementary flats M formed in the distal end 14D of the piston.

Each segment of the inner web 52 is equipped with a hooking notch 58 intended to work in cooperation, by recessing, with a complementary axial projection 60, formed in the second hooking face A2, extending axially into the annular groove 49. Each axial projection 60 is interposed in angle between two flats M, as represented in FIG. 13.

The hooking notches 58 and axial projections 60 form complementary recessing means intended, on the one hand, to work in cooperation with each other when the inner web 52 and the second hooking face A2 are in the relative hooking angular position and, on the other hand, to be released by elastic deformation of the outer collar 50 towards its manoeuvring position.

The fitting of the inner ring 26I on the piston 14 by means of the annular attachment 40 according to the second embodiment of the invention is very simple.

Initially, the inner ring 26I is placed in abutment on the first hooking face A1 formed in the piston.

Then the annular attachment 40 is hooked onto the distal end 14D of the piston in accordance with a fitting of bayonet type; presentation of the annular attachment 40 in the intermediate fitting/removal angular position, pressure on the outer collar 50, rotation of the annular attachment 40 as far as the angular hooking position, then release of the outer collar 50.

Presentation of the Annular Attachment 40 in the Intermediate Fitting/Removal Angular Position (FIGS. 13 and 14).

The annular attachment 40 is presented in front of the distal end 14D of the piston, such that the complementary recessing contours of this end 14D and of the inner web 52 coincide. That makes it possible to recess the annular attachment 40 onto the piston 14.

Pressure on the Outer Collar 50 (FIGS. 15 and 17).

The outer collar 50 is deformed elastically by pressure against the distal face F2 of the inner ring 26I, in the direction indicated by the straight-line arrow in FIG. 15. This makes it possible to place the inner web 52 in the annular groove 49.

Rotation of the Annular Attachment 40 as Far as the Hooking Angular Position (FIG. 16).

While maintaining the pressure on the outer collar 50 so as to offset the inner web 52 and the axial projections 60 axially, the annular attachment 40 is made to turn as far as the hooking angular position illustrated in FIG. 16.

Release of the outer collar 50 (FIGS. 16 and 17).

The outer collar 50 is released, which has the effect of recalling the web 52 into position for recessing the hooking notches 52 in the axial projections 60. This has the effect of immobilising the inner ring 26I in rotation on the piston 14. Furthermore, the inner ring 26I is immobilised axially on the piston 14 by clamping between the first hooking face A1 formed in the piston and the outer collar 50.

The removal of the inner ring 26I is carried out by performing the operations which are the reverse of those described above.

The invention claimed is:

1. Thrust bearing (10) for a clutch of a motor vehicle, comprising an axially movable piston (14), and a ring (26I), integral with a bearing race (C1) hooked onto the piston (14) by the use of elastic pinching means with an axial effect (38, 40) including an annular attachment (40), the ring (26I) being equipped with a proximal face (F1, 62) and with a distal face (F2, 70) which is arranged axially after the proximal face (F1, 62), the proximal face (F1, 62) bearing on a first hooking face (A1, 64) formed in the piston (14), the pinching means (38, 40) bearing on the distal face (F2, 70) of the ring (26I) and a second hooking face (A2, 76) formed in the piston (14), wherein the first (A1, 64) and second (A2, 76) hooking faces formed in the piston (14) are arranged axially in front of the distal face (F2, 70) of the ring (26I),
   wherein the annular attachment (40) has proximal hooking claws (44) bearing on the second hooking face (A2, 76) formed in the piston (14),
   wherein the piston (14) is equipped with axial piercings (46) for the hooking claws (44) to pass through, opening out into the second hooking face (A2, 76) formed in the piston (14), and
   wherein the first hooking face (A1, 64) is delimited by a shoulder (66) formed in a distal end segment (68) of the piston (14), and wherein the distal end segment (68) of the piston (14), in its peripheral axial surface (82) opening out into its distal-end transverse surface (14D, 84), in line with each axial piercing (46), includes a mounting notch (86) which is intended axially to receive the associated hooking claw (44), so as to allow angular indexing of the piston (14) with regard to the hooking claws (44), in the course of its assembly with the annular attachment (40).

2. Thrust bearing (10) according to claim 1, wherein the first (A1, 64) and second (A2, 76) hooking faces formed in the piston (14) form distal and proximal hooking faces, with regard to one another respectively.

3. Thrust bearing (10) according to claim 1, wherein the first (A1) and second (A2) hooking faces formed in the piston (14) form proximal and distal hooking faces, with regard to one another respectively.

4. Thrust bearing (10) according to claim 1, wherein the pinching means comprise an elastic washer (38) with axial effect, equipped with a proximal face (R1) bearing on the distal face (F2, 70) of the ring (26I), and the annular attachment (40) further equipped with a distal collar (42) bearing on a distal face (R2) of the washer (38).

5. Thrust bearing (10) according to claim 4, wherein the piston (14) is equipped with radial piercings (48) for access to the second hooking face (A2, 76) formed in the piston (14) and to the ends of the hooking claws (44) bearing on this second hooking face (A2, 76).

6. Thrust bearing (10) according to claim 1, wherein the upper ends (92) of the hooking claws (44) are in abutment circumferentially against the axial, face-to-face, edges (94) of the notches (86) axially accommodating the hooking claws (44) in order to block the piston (14) in rotation and thus obtain angular indexing of it.

7. Thrust bearing (10) according to claim 6, wherein the axial surface (87) of each mounting notch (86) is extended axially towards the second hooking face or proximal hooking face (A2, 76) by a control ramp (88) inclined axially towards the proximal hooking face (A2, 76) and radially outwards, so as to cause an elastic deformation, radially outwards, of the associated hooking claw (44), in the course of the assembly of the piston (14) with the annular attachment (40), before the claw (44) is recessed into the piston (14).

8. Thrust bearing (10) according to claim 7, wherein each control ramp (88) extends axially towards the proximal hooking face (A2, 76) within the associated axial piercing (46).

9. Method of assembling a piston (14) with a ball bearing (26), the piston (14) and the ball bearing (26) being intended to equip a clutch thrust bearing (10) according to claim 8, the method including the following successive stages:
a) the positioning of the annular attachment (40), by its distal face (90), on the base of a fitting tool;
b) the fitting of the elastic washer (38) coaxially on the annular attachment (40);
c) the fitting of the ball bearing (26) on the elastic washer (38);
d) the fixing of the piston (14) onto the ball bearing (26) by recessing of the claws (44) for hooking the annular attachment (40) into the axial piercings (46) of the piston (14),
wherein the step of fixing of the piston (14) includes the following successive stages:
d1) the axial displacement of the piston (14) towards the ball bearing (26) until it is in axial abutment, by its distal-end transverse surface (14D, 84), against the free proximal axial ends (92) of the hooking claws (44);
d2) the angular indexing of the piston (14), with regard to the hooking claws (44) of the attachment (40), by rotation of the piston (14) about its axis (X) until the hooking claws (44) come into radial abutment in the mounting notches (76); and
d3) the axial displacement of the piston (14) towards the ball bearing (26) until the hooking claws (44) are recessed into the axial piercings (46) of the piston (14).

10. Thrust bearing according to claim 1, wherein the annular attachment (40) is equipped with an outer elastic collar (50) having an axial effect, bearing on the distal face (F2) of the ring (26I), and with an inner web (52) bearing on the second hooking face (A2) formed in the piston (14).

11. Thrust bearing according to claim 10, wherein the outer collar (50) is elastically deformable axially between a maneuvering position, in which the attachment (40) is in an intermediate position for fitting or removal, and a rest position, in which the attachment (40) is in normal position for hooking of the ring (26I), the inner web (52) and the second hooking face (A2) formed in the piston (14) comprising complementary recessing means (58, 60) intended, on the one hand, to work together when the inner web (52) and the second hooking face (A2) are in a predetermined relative hooking angular position, and, on the other hand, to be released by elastic deformation of the outer collar (50) towards its maneuvering position.

12. Thrust bearing according to claim 11, wherein the complementary recessing means comprise at least one notch (58) formed in the inner web (52) intended to work in cooperation with a complementary axial projection (60) formed in the second hooking face (A2) formed in the piston (14).

13. Thrust bearing according to claim 11, wherein the second hooking face (A2) formed in the piston (14) is carried by a distal end (14D) of this piston (14), the inner web (52) of the annular attachment (40) and the distal end of the piston (14) being delimited by complementary recessing contours intended to work together when the annular attachment (40) and the piston (14) are in a predetermined relative intermediate angular position for fitting/removal, offset in angle with respect to the relative angular position for hooking.

14. Thrust bearing according to claim 1, wherein the annular attachment (40) is equipped, on the one hand, with a distal collar (42) featuring elasticity with axial effect the proximal face (R1) of which bears on the distal face (F2) of the ring (26I) and, on the other hand, with the proximal hooking claws (44) bearing on the second hooking face (A2) formed in the piston (14).

\* \* \* \* \*